UNITED STATES PATENT OFFICE.

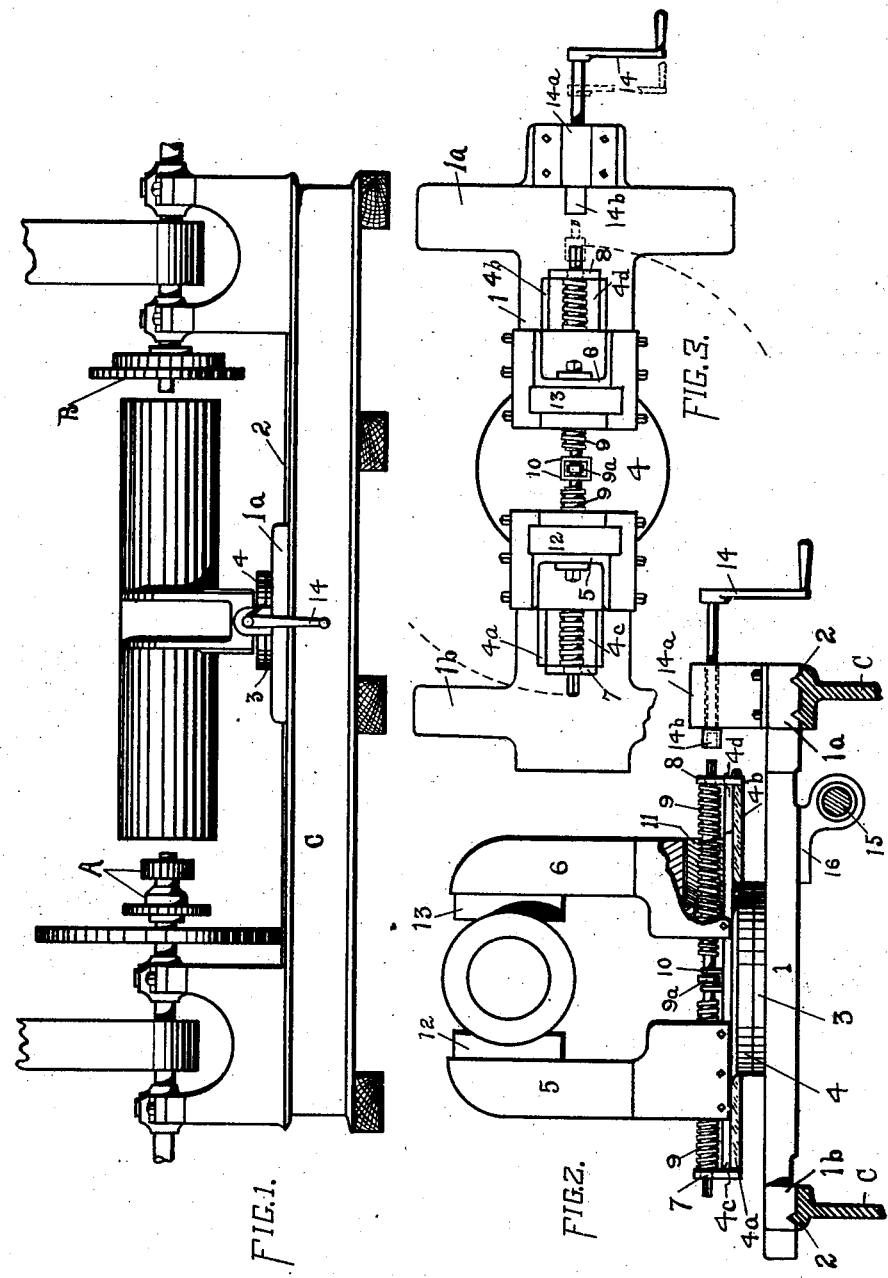

MERRILL F. WILCOX, OF BAY CITY, MICHIGAN, ASSIGNOR TO MICHIGAN PIPE CO., OF BAY CITY, MICHIGAN.

CLAMP FOR TUBE-MORTISING MACHINES.

SPECIFICATION forming part of Letters Patent No. 688,374, dated December 10, 1901.

Application filed April 22, 1901. Serial No. 56,919. (No model.)

*To all whom it may concern:*

Be it known that I, MERRILL F. WILCOX, a citizen of the United States, residing at Bay City, in the county of Bay and State of Michigan, have invented certain new and useful Improvements in Clamps for Tube-Mortising Machines; and I do hereby declare the following to be a full, clear, and exact description of the invention, such as will enable others skilled in the art to which it appertains to make and use the same.

This invention is an improvement in machines for forming mortise and tenon ends upon wooden tubes; and the improvement consists more particularly in the construction, arrangement, and operation of a movable clamp for supporting the tube in a horizontal position and for so moving it that the ends of the tube will be operated upon by the cutter-heads alternately.

A further object is to provide a supporting-clamp for the tube which will permit the tube to be readily turned end for end, so that a mortise may be cut upon each end of the tube or tenons may be cut upon both ends, as desired.

The particular arrangement of mechanism has for its object to minimize the number of working parts and to construct a clamp of the kind described so that it will be simple in operation and construction and have ample strength.

The invention is illustrated in the accompanying drawings, in which—

Figure 1 is a side view of a mortising and tenoning lathe, showing the clamp in its middle position carrying a wooden tube. Fig. 2 is a part sectional elevation of the clamping mechanism, and Fig. 3 is a top view.

As is clearly shown in the drawings, the lathe consists of a cutter-head A for forming the mortise and a second cutter-head B at the other end of the bed-plate for forming the tenon. The two cutter-heads are spaced a distance apart greater than the length of the tube to be operated upon.

Upon the bed-plate C rests the clamping device which forms the subject of this invention. It consists in a base 1, which extends transversely across the lathe, its ends $1^a$ and $1^b$ being lengthened to form saddles, which ride lengthwise the lathe upon V-guides 2, carried by the bed-plate. The middle of the base comprises a circular disk 3, the upper face of which forms a bearing upon which the working parts of the clamp revolve, resting upon the upper disk 4. Two horizontal arms $4^a$ and $4^b$ extend radially from the disk 4 and carry longitudinal guides $4^c$ and $4^d$, along which the clamping-arms 5 and 6 slide. The guides $4^c$ and $4^d$ may be of any suitable cross-section. At the outer ends of the arms $4^a$ and $4^b$ are upwardly-extending flanges or projections 7 and 8, bored horizontally to receive the journaled ends of the clamping-screw 9. This clamping-screw is provided with a rigid central flange or thrust-collar $9^a$, which rotates between brackets 10, secured to the disk 4. The screw 9 passes through threaded holes in the lower ends of the arms 5 and 6. The threads may be cut in the arms; but I prefer to provide a threaded nut 11 for each arm. The latter construction permits the nut to be easily adjusted or renewed when worn. Upon the inner face of each arm near its upper end is a clamping-plate 12 or 13, secured to the arm in any suitable manner and concaved horizontally on its inner face to conform with the curvature of the tube. The screw-threads of the screw 9 on opposite sides of the collar $9^a$ are of opposite pitch, one being right-hand and the other left-hand. Each end of the screw 9, outside of the flanges 7 and 8, is squared, so as to be turned by a socket-crank 14, mounted in a fixed bearing $14^a$ upon one end of the base 1. The spindle of the crank is sufficiently long to permit the socket $14^b$ to be advanced, so as to engage the squared end of the screw, or to be drawn back, so as to clear it.

It is evident that a tube held by the clamping-plates, as shown in Fig. 1, can be turned end for end by revolving it and the clamping-arms horizontally, the disk 4 revolving upon the disk 3, which supports it. The clamping-arms are by reason of the right and left hand threads of the screw 9 always at equal distances from the center, and a cylindrical tube clamped by them will always be central.

The socket-crank 14, which is at the side of the machine within easy reach of the operator, serves not only to operate the clamping-arms from either end of the screw which may be presented to it, but also serves to prevent lateral swinging of the tube out of the center-line while being operated upon by the cutter-heads.

By mounting the ends 1ª and 1ᵇ of the base upon the guides 2 of the bed-plate I am enabled to quickly and easily move the tube into engagement with either cutter-head and then to move it back against the other cutter-head, thus cutting a mortise in one end of the tube and a tenon in the other end.

When it is desired to cut a mortise in both ends or a tenon in both ends, one end of the tube is first advanced upon the proper cutter-head. The tube is then drawn back, turned end for end by revolving it and the clamping-arms which hold it horizontally, and then the other end is advanced to be operated upon by the same cutter-head.

The traversing of the arms 5 and 6 along the bed-plate may be accomplished by means of a lathe feed-screw 15, carried by the bed-plate and operated by any suitable system of friction or toothed gearing. A threaded bracket 16, carried by the base 1, engages the feed-screw 15 as a nut.

By the means above described I have produced a simple, compact, and strong device for clamping tubes while their ends are being shaped whereby the work is accomplished with great rapidity and small amount of labor.

What I claim as my invention, and desire to secure by Letters Patent, is—

1. The combination with a bed-plate having opposing mortise and tenon cutter-heads and a sliding base transversely spanning the bed-plate, with guides lengthwise the bed-plate; of a disk revolubly mounted on said base, carrying diametrically opposite horizontal arms; a screw with oppositely-threaded ends carried by said arms; a pair of vertical arms each having a cylindrically-concaved clamping-plate on its inner face; a threaded opening in each arm engaging one end of the screw; and a spindle mounted in a fixed bearing on the base and adapted to engage either end of the screw.

2. In combination with a tube mortising and tenoning machine, a work-holding clamp comprising a pair of oppositely-placed upright arms having clamping-plates on their inner faces; a revoluble upper base carrying a guide, supporting said arms and slidably engaged by them; a screw having right and left hand ends swiveled in said base for traversing the upright arms simultaneously toward or from each other; a thrust-collar midway the length of said screw and engaging a thrust-bearing on the upper base; a lower base slidably mounted on the bed-plate and carrying the revoluble upper base; a sliding spindle carried by the lower base, having a socket for engaging either end of said screw, substantially as described.

3. In combination with a rotatable tube-clamping device of the class described, having a right and left hand screw; a sliding base supporting said clamping device; a sliding spindle carried by said base and having a socket, forming means whereby said screw can be rotated from either end, and the clamping device locked against turning, substantially as described.

In testimony whereof I affix my signature in presence of two witnesses.

MERRILL F. WILCOX.

Witnesses:
I. GOULD,
GEO. B. WILLCOX.